United States Patent [19]
Tado et al.

[11] Patent Number: 5,973,411
[45] Date of Patent: Oct. 26, 1999

[54] APPARATUS FOR PROTECTING MOTOR VEHICLE AGAINST UNAUTHORIZED OPERATION

[75] Inventors: Masahiro Tado; Kazuyori Katayama, both of Tokyo, Japan

[73] Assignee: Mitsubishi Denki Kabushiki Kaisha, Tokyo, Japan

[21] Appl. No.: 08/667,592

[22] Filed: Sep. 26, 1996

[30] Foreign Application Priority Data

Feb. 15, 1996 [JP] Japan .................................. 8-027860

[51] Int. Cl.$^6$ .................................................. B60R 25/04
[52] U.S. Cl. ................ 307/10.5; 307/10.4; 123/198 DC; 180/287; 340/825.44; 361/171
[58] Field of Search .................... 307/10.5, 10.4, 307/10.3, 10.2, 10.6; 180/287; 70/DIG. 46; 123/198 DB, 198 DC; 340/425.5, 426, 825.31, 825.32, 825.44, 825.72; 361/171

[56] References Cited

U.S. PATENT DOCUMENTS

| | | | |
|---|---|---|---|
| 5,646,456 | 7/1997 | Udoh et al. .............................. | 307/10.5 |
| 5,708,307 | 1/1998 | Iijima et al. ............................ | 307/10.3 |
| 5,783,994 | 7/1998 | Koopman et al. ...................... | 307/10.4 |
| 5,796,179 | 8/1998 | Honaga .................................. | 180/287 |
| 5,838,074 | 11/1998 | Loeffler et al. ......................... | 307/10.4 |

*Primary Examiner*—Albert W. Paladini
*Attorney, Agent, or Firm*—Sughrue, Mion, Zinn, Macpeak & Seas, PLLC

[57] ABSTRACT

An antitheft apparatus for a motor vehicle can allow operation of an internal combustion engine of a motor vehicle to be started notwithstanding of decision of discrepancy in an engine start enabling signal ascribable to transient error in communication between a code collating means and an engine start decision means. An identification code stored in an engine key (1) is read out upon every starting of operation of the motor vehicle to be collated with a preset identification code to thereby make decision as to whether or not both of the identification codes coincide with each other. Upon decision of coincidence, the identification code as read out is affixed with a rolling code which is updated every time the engine of the motor vehicle is operated, to thereby generate an engine start enabling signal. Means are provided for sending the engine start enabling signal and for generating the rolling code. The rolling code as generated is sent to the rolling code adding means (30*b*). Decision is made as to coincidence between the identification code contained in the engine start enabling signal and the preset identification code, wherein upon detection of coincidence of the identification codes, the rolling code contained in the engine start enabling signal is collated with the rolling code generated by the rolling code generating means, to thereby output the engine start enabling signal to engine starting means upon detection of coincidence between the rolling codes.

9 Claims, 9 Drawing Sheets

APPARATUS FOR PROTECTING MOTOR VEHICLE AGAINST UNAUTHORIZED OPERATION

BACKGROUND OF THE INVENTION

1. Field of the Invention

The present invention generally relates to an apparatus for protecting an automobile or motor vehicle against unauthorized operation thereof and particularly to an antitheft apparatus which allows operation of an internal combustion engine of a motor vehicle to be started while confirming the authenticity of an identification code inputted from an engine key upon starting of the engine. More particularly, the present invention is concerned with a motor-vehicle antitheft apparatus which can ensure higher security for the protection of a motor vehicle against unauthorized operation by complicating the identification code (hereinafter referred to as the ID code for short).

2. Description of Related Art

Heretofore, when a motor vehicle or automobile is started, an engine operation starting switch is turned on by using a mechanical cylinder key (hereinafter also referred simply to as the key) delivered by the dealer to the user who is authorized to drive the motor vehicle, for the purpose of protecting the automobile against unauthorized operation for a wrong purpose such as theft. However, because such key can effectively be copied or forged relatively easily, the antitheft function as desired can not be achieved.

As an approach for reinforcing or enhancing the antitheft function, there has already been proposed such an arrangement that an ID code identifying a key specific to a motor vehicle of concern is transmitted to a key cylinder assembly installed in the motor vehicle upon insertion of the key, whereupon the ID code as inputted is discriminatively identified to be subsequently sent to a code collating means. When the ID code is decided to be an authentic ID code, the code collating means then sends an engine start enabling signal to an engine starting means. Such system is disclosed, for example, in Japanese Unexamined Patent Application Publication No. 15141/1992 (JP-A-4-15141).

More specifically, in the antitheft apparatus for a motor vehicle disclosed in the publication mentioned above, the engine start enable signal transmitting circuit is implemented in such an arrangement that the key cylinder installed in the motor vehicle is provided with a rotor coil wound on an annular core which is disposed around a key insertion slot or key hole formed in the key cylinder, while a key coil is wound on an axial core interiorly of the key. Thus, by inserting the key into the key cylinder, an electromagnetic induction circuit is formed by the key coil and the rotor coil positioned close to each other. Thus, under the action of the electromagnetic induction between the both coils, the ID code can be transmitted to the key cylinder. In response, the key cylinder sends the ID code as received to the code collating means.

When the ID code as received is decided to be justifiable or authentic by the code collating means, an engine start signal is generated to be sent to an engine operation start decision means. As such motor-vehicle antitheft apparatus that is arranged for making decision as to whether the engine start operation is to be inhibited (disabled) or allowed (enabled) on the basis of the ID code stored in the key, there is known a motor-vehicle antitheft apparatus of such a structure as shown in FIG. 9. For having a better understanding of the background technology of the invention, this known motor-vehicle antitheft apparatus will be described in some detail.

Referring to FIG. 9, a cylinder key 1 used for starting an internal combustion engine (hereinafter also referred to simply as the engine) of a motor vehicle has a manipulating head 1a which incorporates as embedded therein a key coil antenna $1a_1$ serving for both functions of an induction coil in which a voltage is induced under the electromagnetic induction, an antenna for effectuating radio communication and an integrated circuit (also referred to as IC in abbreviation) $1a_2$ which includes a nonvolatile memory (e.g. electrically erasable programmable read-only memory or EEPROM in abbreviation, not shown) for storing an ID code which is inherently allocated to the key 1, and a control circuit for signal transmission and reception.

On the other hand, a key cylinder 2 mounted on the motor vehicle in a cab thereof is provided with a keyhole $2a_1$ into which a key blade 1b (i.e., a main body of the cylinder key 1) is to be inserted, wherein there is provided around the keyhole $2a_1$ a key cylinder coil antenna $2a_2$ which serves not only as an induction coil for inducing a voltage in the key coil antenna $1a_1$ incorporated in the key head portion 1a in the inserted state thereof but also as an antenna for performing a signal communication with the key coil antenna $1a_1$ by making use of the electromagnetic induction taking place between the coils $1a_1$ and $2a_2$. By inserting the key blade 1b into the key cylinder 2 and rotating it, an ignition key switch 2b is closed to thereby transmit a power-on signal SG and other demanded signals such as command signals to an engine control unit or ECU incorporating a code collating means 3, an engine start decision means 5 and others.

The code collating means 3 is put into operation in response to the power-on signal SG generated by the ignition key switch 2b. As can be seen in FIG. 9, the code collating means 3 is comprised of a power source 3a for supplying a voltage to various constituent parts of the code collating means 3 in response to the power-on signal SG inputted from the ignition key switch 2b, a radio frequency circuit (hereinafter also referred to as the RF circuit) 3c for sending a high frequency signal destined for the electromagnetic induction to the key cylinder coil antenna $2a_2$ while receiving the ID code signal sent out from the key 1 through the key cylinder coil antenna $2a_2$ under the action of the electromagnetic induction, a control unit 3b for comparing the ID code as inputted with an ID code stored in an electrically erasable programmable read-only memory (hereinafter referred to as the EEPROM in abbreviation) 3e for generating and outputting an engine operation starting signal when coincidence is determined between the input ID code and the stored ID code, and a communication interface 3f for allowing a signal (engine start enabling signal or engine start disabling or inhibiting signal) SE to be transferred between the code collating means 3 and the engine operation start decision means 5.

On the other hand, the engine start decision means 5 includes a communication interface $5_1$ for realizing the signal transfer (i.e., signal input/output) with the code collating means 3 and a control unit $5_2$ incorporated in the engine starting means 5 for making decision as to coincidence between the engine start enabling signal SE as received and a corresponding signal stored previously in an EEPROM $5_4$, to thereby output the engine start enabling or disabling signal to an engine operation starting means 7 in dependence on the result of the coincidence decision mentioned above.

Next, description will turn to operation of the motor-vehicle antitheft apparatus of the structure described above. For starting operation of the engine of the motor vehicle, the operator or driver inserts the cylinder key 1 into the key cylinder 2 and rotates the key 1 in an attempt to start the engine. As a result of this, the contact of the ignition key switch 2b is chaned over to a position at which the power-on signal SG is supplied to the code collating means 3 and the engine start decision means 5. In response to the input of the power-on signal SG, the power source 3a operates to supply to the control unit 3b electric power from an onboard battery (not shown).

When the control unit 3b is put into operation in response to the supply of the electric power, the RF circuit 3c sends a high frequency signal to the key cylinder coil antenna $2a_2$ for excitation thereof, as result of which an electric current or voltage is induced in the key coil antenna $1a_1$ incorporated in the cylinder key 1 under the effect of electromagnetic induction excited by the key cylinder coil antenna $2a_2$.

Upon application of the induced voltage to the IC (integrated circuit) $1a_2$, a capacitor incorporated in the IC $1a_2$ is electrically charged to serve as a power source for the IC $1a_2$. During a period in which the capacitor is being charged, the coil antennas $1a_1$ and $2a_2$ are used as the antennas for signal transmission/reception. To this end, sending of the high frequency signal from the RF circuit 3c to the key cylinder coil antenna $2a_2$ is stopped under the control of the control unit 3b. The time point at the sending of the high frequency signal is stopped is detected by the control unit 3b. During the period in which the sending of the high frequency signal is stopped, the IC $1a_2$ reads out the ID code inherently allocated to the key 1 from the non-volatile memory (e.g. EEPROM, not shown) and converts it into a signal suited for transmission, which signal is then transmitted to the key cylinder coil antenna $2a_2$ via the key coil antenna $1a_1$ under the electromagnetic induction.

The signal mentioned just above is then received by the RF circuit 3c and digitized by the control unit 3b to be converted to a digitized ID code, which is then collated or matched by the control unit 3b with a verification code stored previously in the EEPROM 3e. When the collation shows a discrepancy between both the codes mentioned above, the engine start disable or inhibit signal SE is transmitted to the engine starting system 5 via the communication interface 3f, whereby the engine of the motor vehicle is inhibited from starting.

On the other hand, when coincidence is detected between both the codes mentioned above, the control unit 3b generates an engine start signal SE by adding the ID code with a rolling code which is updated newly in response to a corresponding signal supplied from the engine start decision means 5, every time the ignition key switch 2b is turned off, wherein the engine start signal SE as generated is sent to the control unit $5_2$ of the engine start decision means 5 through the communication between the interface units 3f and $5_1$.

In response to the engine start signal SE as received, the control unit $5_2$ compares the ID code and the rolling code contained in the engine start signal SE with those stored in the EEPROM $5_4$ to thereby decide coincidence or discrepancy between them. When discrepancy is detected, the control unit $5_2$ sends the engine start inhibit or disable signal to the engine operation starting means 7. On the contrary, upon decision of coincidence, the control unit $5_2$ sends to the engine start enable signal to the engine operation starting means 7, whereupon operation of the internal combustion engine of the motor vehicle is started.

The structure of the hitherto known motor-vehicle antitheft apparatus described above is certainly effective for preventing unauthorized attempt for operating the motor vehicle such as stealing by monitoring and deciphering the communication signal(s) transferred between the code collating means and the engine start decision means to thereby illegally start the engine with the engine start signal. However, the engine start decision means 5 requires to this end an EEPROM which is an external memory for storing the rolling code received in a preceding cycle in order to execute the coincidence decision processing for detecting coincidence between the rolling code contained in the engine start enable signal currently sent from the code collating means 3 and the rolling code sent in the preceding cycle.

Such being circumstances, two EEPROMs, i.e., one incorporated in the engine starting means and the other incorporated in the code collating means are indispensably required, which of course increases the cost of the system as a whole, giving rise to a problem. Besides, there may arise another undesirable situation that upon occurrence of erroneous decision of the rolling code due to temporary or transient communication error between the code collating means 3 and the engine start decision means 5, operation of the internal combustion engine of the motor vehicle can not be started even when an authentic key is used, thus involving eventually degradation in the system reliability.

SUMMARY OF THE INVENTION

In the light of the state of the art described above, it is an object of the present invention to provide an antitheft apparatus for a motor vehicle which can avoid the shortcomings of the conventional apparatus described above.

More particularly, it is an object of the present invention to provide an antitheft apparatus for a motor vehicle which can allow operation of an internal combustion engine of a motor vehicle to be started even when discrepancy with the rolling code is decided by the engine start decision means due to temporary or transient error in communication between the code collating means and the engine start decision means.

In view of the above and other objects which will become apparent as the description proceeds, there is provided according to a general aspect of the present invention an apparatus for protecting a motor vehicle against unauthorized operation thereof (also referred to as the motor-vehicle antitheft apparatus), which apparatus includes a code reading means for reading out an identification code stored in an engine key upon every starting of operation of the motor vehicle. The code reading means is provided in association with means for receiving the engine key. Further, the apparatus includes an identification code decision means for collating the identification code read out from the engine key with a preset identification code to thereby make decision as to whether or not both of the identification codes coincide with each other, a rolling code adding means responsive to coincidence between both of the identification codes for thereby adding or affixing to the identification code as read out a rolling code updated every time the internal combustion engine of the motor vehicle is operated, to thereby generate an engine start enabling signal, an engine start enabling signal sending means for sending the engine start enabling signal, a rolling code generating means for generating the rolling code which is updated every time the engine is operated, a rolling code sending means for sending the rolling code generated to the rolling code adding means, an engine start enabling signal receiving means for receiving the engine start enabling signal, an identification code decision means for making decision as to coincidence between the identification code contained in the engine start enabling signal as received and the preset identification code, and a rolling code decision means responsive to coincidence of the identification codes for thereby collating the rolling code contained in the engine start enabling signal with the rolling code generated by the rolling code generating means, to thereby output the engine start enabling signal to engine starting means upon detection of coincidence between the rolling codes.

In a preferred mode for carrying out the invention, the rolling code decision means may be so arranged as to receive again the engine start enabling signal from the rolling code adding means through the engine start enabling signal receiving means upon decision of discrepancy between the rolling codes, to thereby make decision as to coincidence of the rolling codes.

In another preferred mode for carrying out the invention, the rolling code generating means may be so implemented as to generate a rolling code differing from that generated in precedence, to thereby send the generated rolling code to the rolling code adding means by way of the rolling code sending means, when the rolling code decision means decides discrepancy between the rolling codes.

In yet another preferred mode for carrying out the invention, the rolling code sending means may be so implemented as to update the rolling code upon turning-off of the engine key to thereby send the updated rolling code to the rolling code adding means.

According to another aspect of the invention, there is provided an apparatus for protecting a motor vehicle against unauthorized operation thereof, which apparatus includes a code reading means for reading out an identification code stored in an engine key upon every starting of operation of the motor vehicle, which code reading means is provided in association with means for receiving the engine key, an identification code decision means for collating the identification code read out from the engine key with a preset identification code to thereby make decision as to whether or not both of the identification codes coincide with each other, a first rolling code arithmetic operation means for arithmetically determining the rolling code on the basis of a variable which is updated upon every operation of the engine, a rolling code adding means responsive to coincidence between both of the identification codes for thereby adding to the identification code as read out a rolling code determined arithmetically to thereby generate an engine start enabling signal, an engine start enabling signal sending means for sending the engine start enabling signal, a variable generating means for generating a variable which is updated every time the engine is operated, a second rolling code arithmetic means for arithmetically determining the rolling code on the basis of the variable as generated, a variable sending means for sending the generated variable as generated to the first rolling code arithmetic operation means, an engine start enabling signal receiving means for receiving the engine start enabling signal, an identification code decision means for making decision as to coincidence between the identification code contained in the engine start enabling signal as received and the preset identification code, and a rolling code decision means responsive to coincidence of the identification codes for thereby collating the rolling code contained in the engine start enabling signal with the rolling code generated by the second rolling code arithmetic operation means, to thereby output the engine start enabling signal to engine starting means upon detection of coincidence between the rolling codes.

In still another preferred mode for carrying out the invention, the motor-vehicle protecting apparatus may further include a plurality of the first rolling code arithmetic operation means and a plurality of the second rolling code arithmetic operation means which differ from one another in respect to arithmetic operation expression. Every time the internal combustion engine of the motor vehicle is operated, the first and second rolling code arithmetic operation means may be selected sequentially. A variable determined arithmetically may be placed in the arithmetic operation expression as selected to thereby determine arithmetically the rolling code.

In a further preferred mode for carrying out the invention, the motor-vehicle protecting apparatus mentioned above may include a plurality of the first rolling code arithmetic operation means and a plurality of the second rolling code arithmetic operation means which differ from one another in respect to arithmetic operation expression, wherein every time the internal combustion engine of the motor vehicle is operated, the first and second rolling code arithmetic operation means are selected at random, while a variable determined arithmetically is placed in the arithmetic operation expression as selected to thereby determine arithmetically the rolling code.

In yet further preferred mode for carrying out the invention, when discrepancy between the rolling codes is decided by the rolling code decision means, the variable generating means arithmetically determines a variable differing from the one generated the last time, whereupon the variable is then sent to the first and second rolling code arithmetic operation means by way of the variable sending means.

In still further preferred mode for carrying out the invention, the variable generating means may be so implemented as to send a variable as updated when the engine key is turned off to the first and second rolling code arithmetic operation means.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
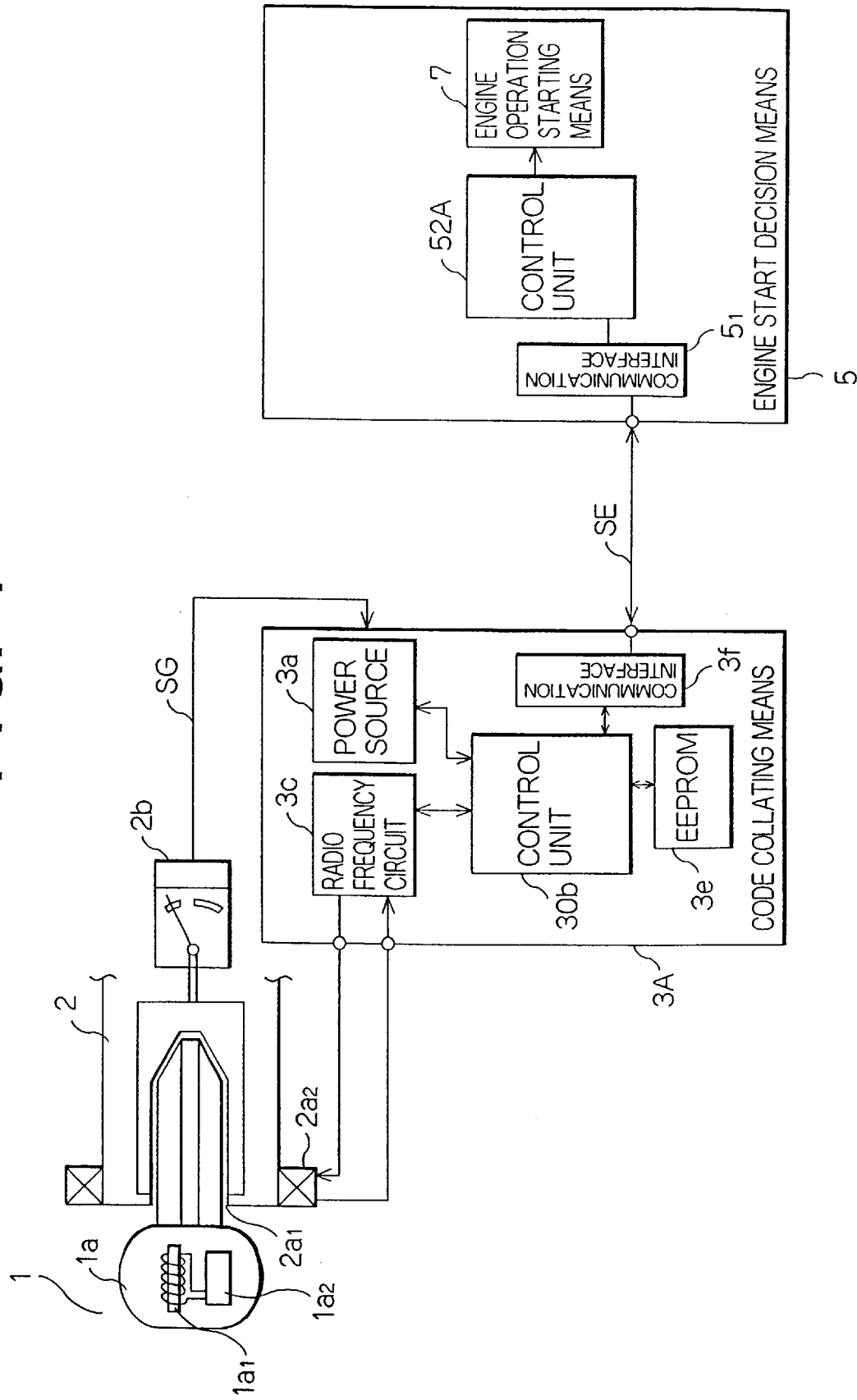
FIG. 1 is a block diagram showing an arrangement of a motor-vehicle antitheft apparatus according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 9:
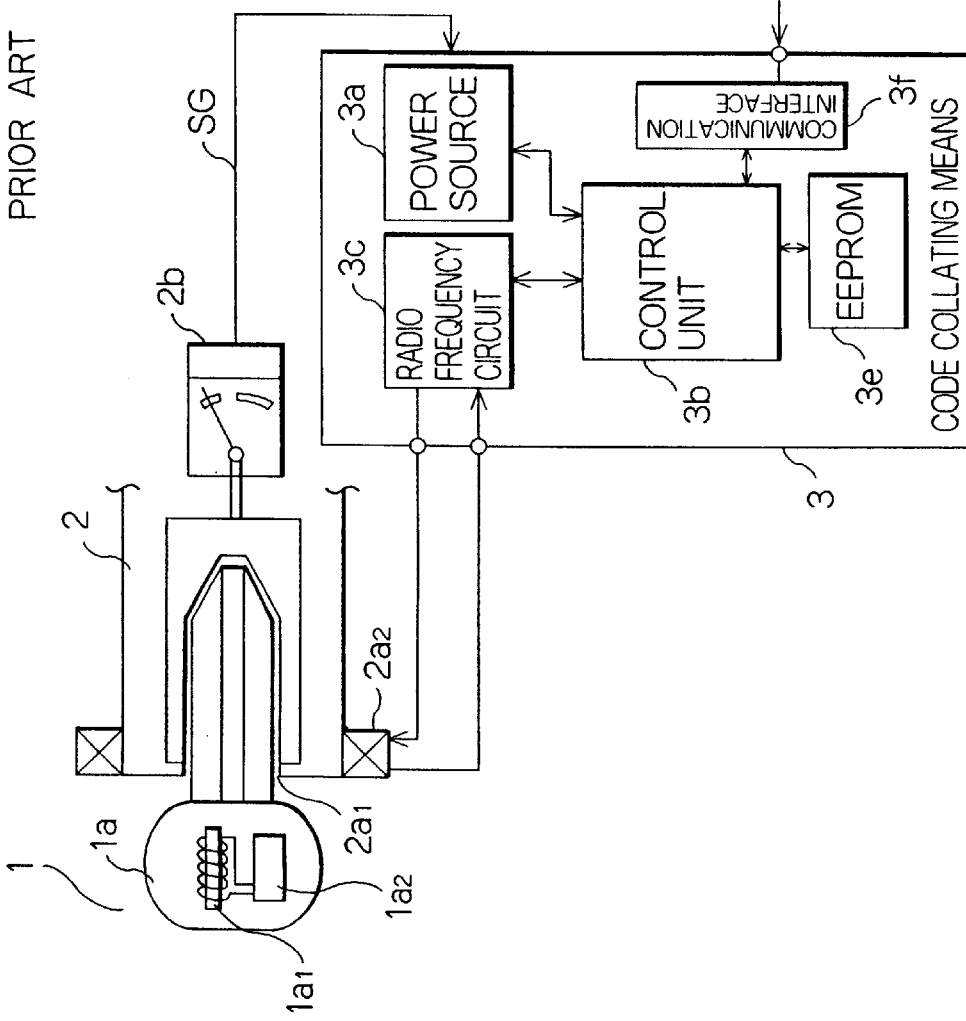
FIG. 9 is a block diagram showing a structure of a conventional motor-vehicle antitheft apparatus known heretofore.

FIG. 1 is a block diagram showing an arrangement of an antitheft apparatus for a motor vehicle according to a first embodiment of the present invention. In the figure, parts same as or equivalent to those shown in FIG. 9 are denoted by like reference characters. A control unit 30b constituting a part of the code collating means now designated by 3A and incorporated in the motor-vehicle antitheft apparatus according to the instant embodiment is so arranged that upon reception of the rolling code which is sent again or resent from the engine start decision means 5A every time discrepancy in the rolling code is detected, the control unit 30b adds the rolling code resent with an ID code read out, to thereby generate data to be transmitted to the engine start decision means 5A.

Figure 8:
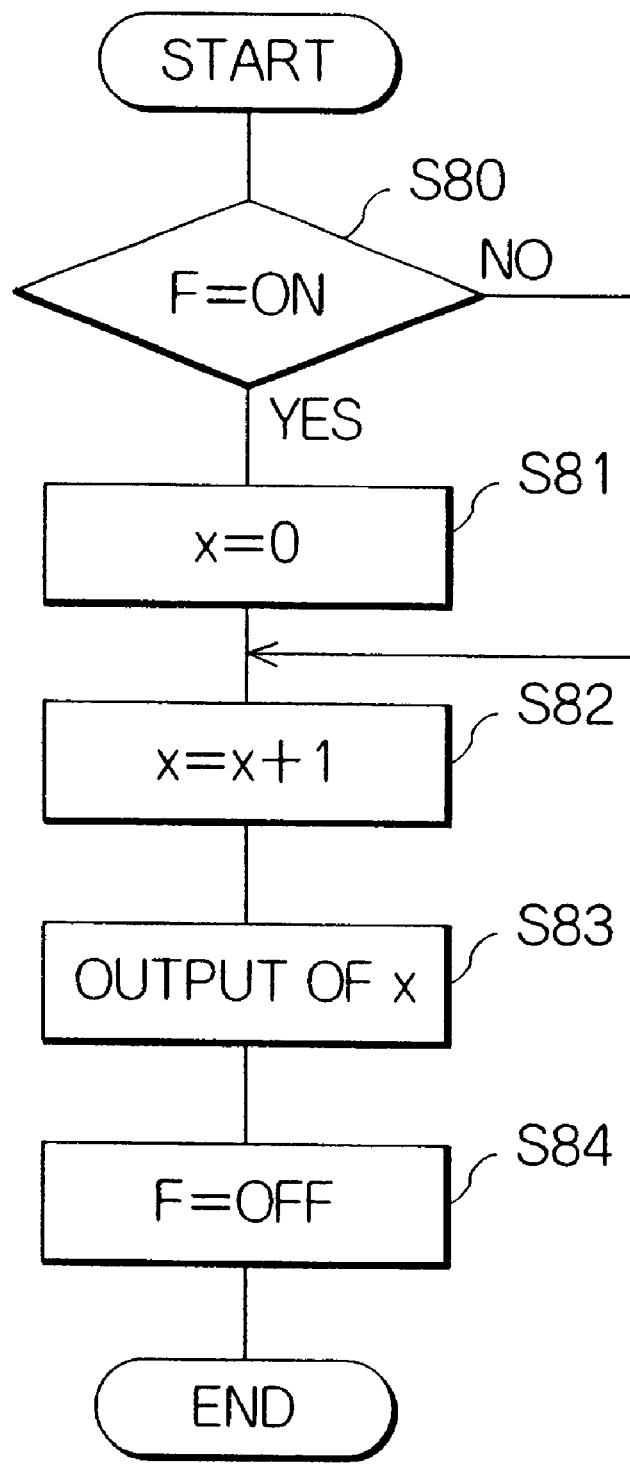
FIG. 8 is a flow chart for illustrating operation of a rolling code generating means incorporated in the motor-vehicle antitheft apparatuses according to the invention.

More specifically, the engine start decision means 5A incorporated in the motor-vehicle antitheft apparatus according to the instant embodiment of the invention includes a rolling code generating means for executing an arithmetic processing illustrated in a flow chart of FIG. 8 every time the ignition key switch 2b is turned off, to thereby generate the rolling code, differing from the conventional system according to which the rolling code is read out from the EEPROM (Electrically Erasable Programmable Read-Only Memory) constituting an external memory every time the ignition key switch 2b is turned off, as described hereinbefore.

At this juncture, it should be mentioned that the RF (Radio Frequency) circuit 3c constitutes a code read-out means, the control unit 30b serves as an ID code decision means and as the rolling code adding means, the communication interface 3f constitutes an engine start enabling signal sending means, the communication interface $5_1$ constitutes an engine start enabling signal receiving means, and that the control unit 52A serves as the ID code decision means and as the rolling code decision means.

Figure 2:
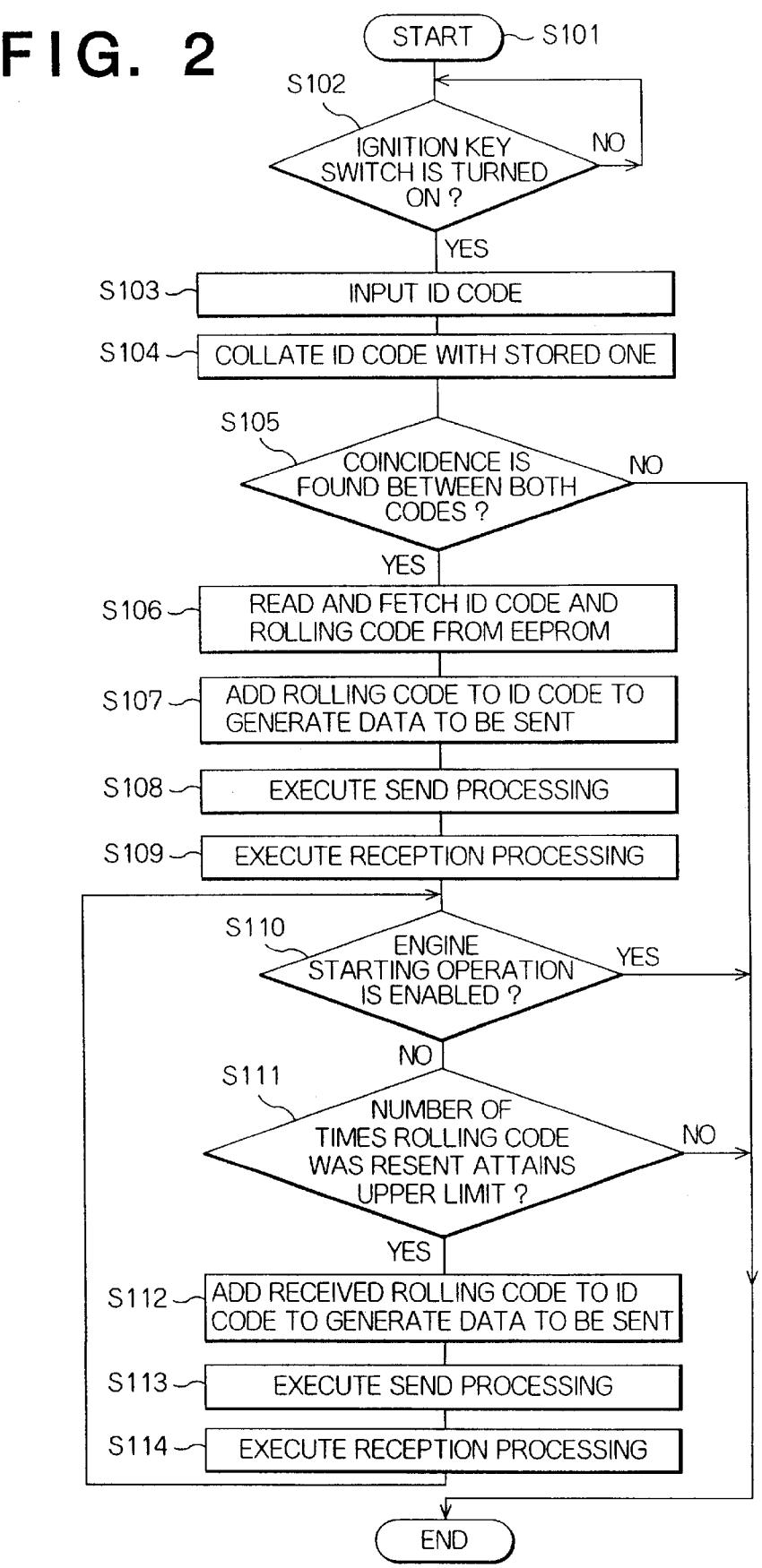
FIG. 2 is a flow chart for illustrating operation of a code collating means incorporated in the motor-vehicle antitheft apparatus according to the first embodiment of the invention.

Next, referring to a flow chart shown in FIG. 2, operation of the code collating means 3A incorporated in the motor-vehicle antitheft apparatus according to the instant embodiment of the invention will be described. Since the operation of the code collating means 3A is substantially similar to that of the motor-vehicle antitheft apparatus known heretofore except for the operation of the control unit 30b, the following description will primarily be directed to the operation of the control unit 30b.

At first, in a step S101, a driver getting on a motor vehicle inserts the key 1 into the key cylinder 2 and rotates the key 1. Then, the ID code collating operation is started. In a step S102, the control unit 30b checks whether or not the contact position of the ignition key switch 2b is changed over as a result of the rotation of the key 1, and thus whether the power-on signal SG is inputted. The check operation mentioned above is repeated until the power-on signal SG is inputted.

When it is decided that the contact position of the ignition key switch 2b is changed over and thus the power-on signal SG is inputted, the processing proceeds to a step S103 where electric power is supplied to the key 1 under the action of the electromagnetic induction and the ID code is read out to be fetched from the key 1. Subsequently, the processing proceeds to a step S104 where the ID code as fetched is collated or matched with the ID code stored previously in the EEPROM 3e for the collation.

In a step S105, the result of the collation executed in the step S104 is checked. When no coincidence is found between the ID code as fetched and the reference ID code stored previously for the collation, it is then decided that attempt for starting the engine operation is being conducted by using an illegal or unauthentic ID code, whereupon the processing for the ID code collation is terminated. On the other hand, when coincidence is found in the collation of the ID codes, the rolling code stored previously in the EEPROM 3e and the ID code which has passed the collation step are fetched. The rolling code stored in the EEPROM 3e is one which corresponds to the code generated by the engine start decision means 5A when the ignition key switch 2b was turned off the last time and which was stored in the memory of the control unit 3b.

In a step S107, the ID code is added or affixed with the rolling code to thereby generate data (engine start enabling signal) to be sent out from the control unit 30b. Subsequently, in a step S108, a data send processing is performed for allowing the engine start decision means 5A to make decision as to whether the engine operation is to be started or not on the basis of the above-mentioned data (i.e., engine start enabling signal) sent to the decision means 5A. Now, the processing proceeds to a step S109 where processings for receiving the rolling code sent from the engine start decision means 5A and indicating the result of the engine start decision, engine start enable/disable (inhibit) information indicating inhibition or permission of the engine start operation or data indicating the number of times the rolling code has been resent are performed.

In a succeeding step S110, it is decided on the basis of the engine start enable/disable information as received whether the engine starting operation is enabled, when the result of this step S110 is affirmative ("YES"), then decision is made that the engine starting operation is based on the authentic data, whereupon the collation processing comes to an end. By contrast, when decision made in the step S110 results in negation ("NO"), indicating that the engine starting operation is inhibited, then it is checked whether or not the number of resending times of the rolling code as received exceeds an upper limit value imposed thereto.

When it is decided that the number of times the rolling code was resent exceeds the upper limit, the collating operation is terminated. More specifically, when discrepancy is detected between the ID code or the rolling code contained in the data as received and the code preset in the engine start decision means 5A, it is then decided that the inter-code discrepancy is ascribable to a possibility that the data is inadvertently falsified by error in the communication effected between the code collating means 3A and the engine start decision means 5A, whereupon the engine start decision means 5A resends (i.e., sends again) the rolling code for receiving again the data from the code collating means 3A.

At this juncture, it should be mentioned that when an illegal or unauthentic rolling code is used for sending the aforementioned data to the engine start decision means 5A, the ID code discrepancy is decided in continuation. Accordingly, the engine start decision means 5A resends the rolling code for receiving the data and counts the number of times the rolling code is resent (i.e., sent repetitively). When the code collating means decides on the basis of the data as received that the number of times the rolling code was repetitionally sent exceeds the upper limit number mentioned above, then the collating operation or processing is terminated by deciding that the use of the illegal ID code is determined by the engine start decision means 5A and thus the engine start disabling or inhibiting processing is executed by the engine start decision means 5A.

However, unless it is decided in the step S111 that the number of times the rolling code was resent exceeds the upper limit number, the collating operation is continued by repetitionally inputting the data for the decision until it is decided that the number of times the rolling code was resent exceeds the upper limit number for the reason described previously.

When it is determined that the collating operation has to be continued, the processing proceeds to a step S112 where the ID code read out from the EEPROM 3e is added or affixed with the rolling code received again in the step S109 to thereby generate the data to be outputted, as described previously. In succession, a processing for sending the data generated to the engine start decision means 5A is executed in a step S113. Next, in a step S114, the data for decision is received from the engine start decision means 5A, as described hereinbefore in conjunction with the processing step S109, whereupon the processing in the step S110 is resumed.

The collating operation is continued until it is decided that the engine start enabling information is obtained or until the number of times the rolling code was resent exceeds the upper limit number.

Figure 3:
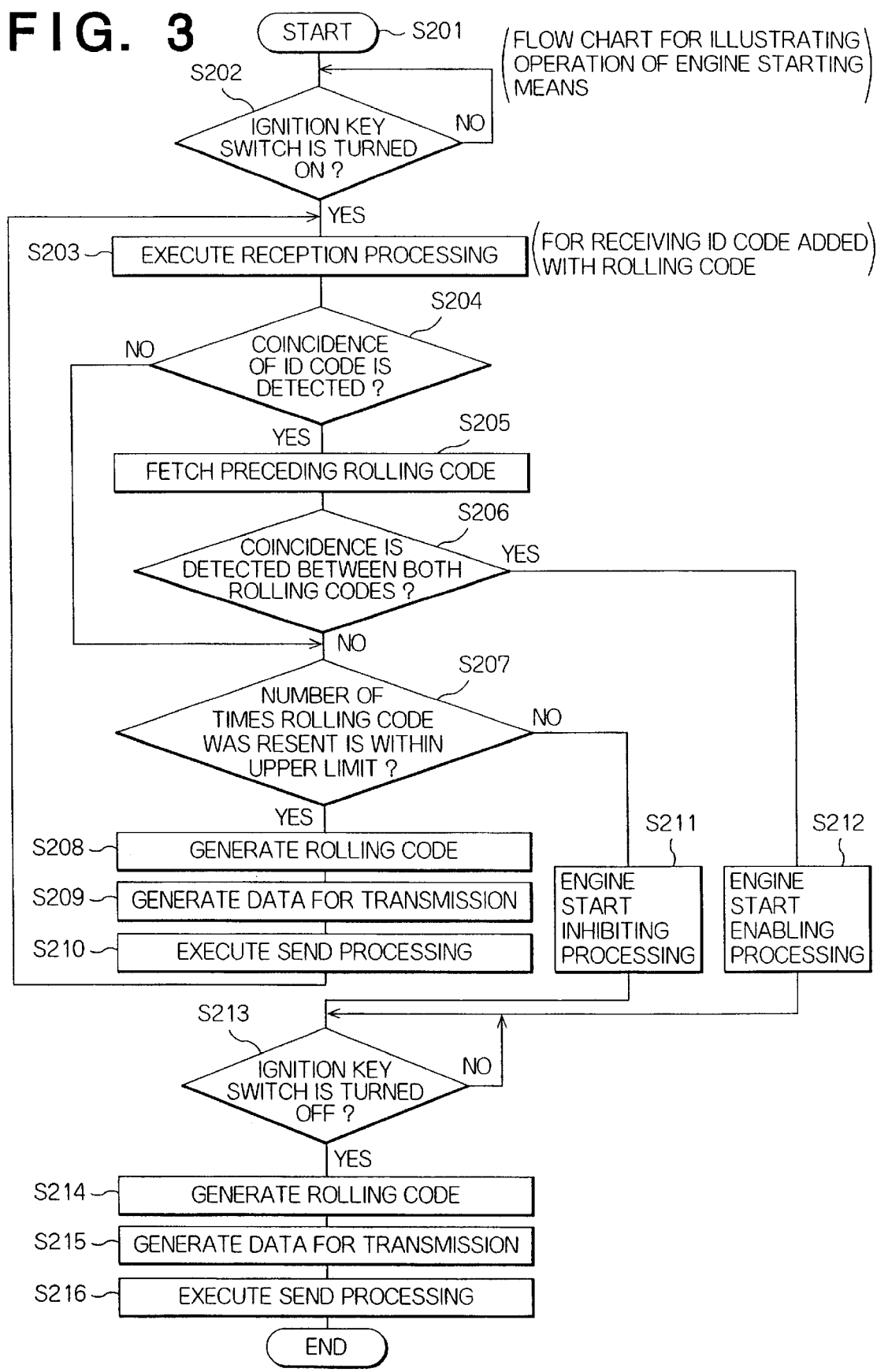
FIG. 3 is a flow chart for illustrating operation of an engine start decision means incorporated in the motor-vehicle antitheft apparatus according to the first embodiment of the invention.

Next, description will turn to an engine start decision processing executed by the control unit 52A constituting a part of the engine start decision means 5A by reference to a flow chart shown in FIG. 3. It should first be mentioned that the rolling code generating means is incorporated in the control unit 52A of the engine start decision means 5A for generating the rolling code by arithmetic operation every time the ignition key switch 2b is turned off, in place of providing an external EEPROM to be used for storing the rolling code. Before entering into description of the engine start decision processing, an arithmetic processing for generating the rolling code will generally be described by reference to FIG. 8.

At first, it is decided in a step S80 whether or not a flag F is set or "ON" in order to decide whether or not it is the first time to execute the engine start decision processing. When the flag is set (i.e, "ON"), the processing proceeds to a step S81 where a variable x used for arithmetically determining the rolling code is initialized to "0" (zero).

In a step S82, the value "0" of the variable x is replaced by "1" so that "x=1" applies valid. The value "1" is generated as the rolling code in a step S83. After generation of the rolling code, the processing proceeds to a step S84 where the flag F is reset to "OFF". When the ignition key switch 2b is turned off next time, the variable x assumes a value "2" in dependence on the result of the arithmetic operation in the step S82. Thus, the rolling code of "2" is outputted in the step S83. In this manner, every time the ignition key switch 2b is turned off, the rolling code as generated is updated. In this conjunction, it is noted that the arithmetic operation for updating the rolling code is never restricted to the scheme mentioned above but any other suitable routine for making the rolling code be updated every time the ignition key switch 2b is turned off may be adopted.

When the driver gets on the motor vehicle, inserts the key 1 into the key cylinder 2 and rotates the key 1, the contact position of the ignition key switch 2b is changed. Then, the control unit 52A makes a decision in a step S202 whether or not the power-on signal SG is outputted. Unless the power-on signal SG is inputted, decision processing for checking whether or not the power-on signal SG is inputted is executed repetitively.

When it is decided that the power-on signal SG is inputted with the contact position of the ignition key switch 2b having been changed correspondingly, the processing proceeds to a step S203 where the reception processing for receiving the data sent from the code collating means 3A is executed. Subsequently, in a step S204, the ID code contained in the data as received is compared with the ID code stored in an internal ROM (Read-Only Memory) for thereby deciding whether coincidence can be found between the ID code as received and the ID code stored in the internal ROM.

When coincidence is found in the comparison of both the ID codes mentioned above, the processing proceeds to a step S205 where the control unit 52A reads out the rolling code which was arithmetically determined when the ignition key switch 2b was turned "OFF" the last time and held in an internal register. The rolling code as read out is compared in a step S206 with the rolling code contained in the data received in the step S203. When coincidence is detected in the step S206, the processing proceeds to a step S212 where the engine start enabling processing is executed.

On the other hand, when discrepancy between the ID codes is found, the processing proceeds to a step S207 where it is checked whether or not the number of times the rolling code was resent (or sent again) to the code collating means 3A for obtaining the data therefrom has reached the preset upper limit number. Unless the upper limit number has been attained, the processing proceeds to a step S208 at which the rolling code is again read out from the internal register.

The rolling code read out is converted into data suited for sending out in a step S209, whereupon the processing proceeds to a step S210 where the send-out or transmission processing is performed. More specifically, every time the rolling code is sent repeatedly, the code collating means 3A adds the ID code with the rolling code to thereby generate the data to be sent back to the engine start decision means 5A.

The engine start decision means 5A repetitionally executes a routine comprised of the step S204 to the step S210 inclusive thereof upon every reception of the data in the step S203. When the ID code and the rolling code contained in the data as received coincide with the respective preset codes, the engine start enabling processing is executed in a step S212.

However, unless the ID code or the rolling code coincides with the respective preset code and when it is decided in the step S207 that the number of times the rolling code was resent exceeds the upper limit number, the processing proceeds to a step S211 where the engine start disabling or inhibiting processing is executed.

When the engine start disable or inhibit processing is executed in the step S211 or when the engine start enabling processing is executed in the step S212, the processing proceeds to a step S213 to validate the engine start disabling or inhibiting mode to wait for detection of the turn-off of the ignition key switch 2b. Upon detection of the turn-off of the ignition key switch 2b, the processing proceeds to a step S214 where a new rolling code is generated by the arithmetic processing illustrated in FIG. 8 and executed by the rolling code generating means.

After conversion of the rolling code into the data to be sent out in a step S215, the processing proceeds to a step S216, whereupon the processing of concern comes to an end, after executing the rolling code sending processing to the code collating means 3A. The rolling code as sent out is stored in the EEPROM 3e incorporated in the code collating means 3A. At the same time, information concerning the number of times the rolling code was counted, the result of the engine start disable or inhibit processing as well as the engine start enable processing is reset.

In the foregoing description, it has been assumed that upon decision of discrepancy of the rolling code, the same rolling code is generated to be resent. It should however be appreciated that different rolling codes may be generated for the resend on the basis of the result of the arithmetic processing shown in FIG. 8. In that case, secrecy of the rolling code can be enhanced significantly.

As is apparent from the foregoing, according to the instant embodiment of the invention, the EEPROM which is an external memory for the motor-vehicle antitheft apparatus can be spared, which leads to reduction of manufacturing cost of the motor-vehicle antitheft apparatus as a whole. Besides, even when discrepancy between the ID codes or the rolling codes should accidentally be detected, reliability of the motor-vehicle antitheft apparatus can remarkably be enhanced because the collating operation can not definitely be stopped. Furthermore, by generating the rolling code and sending it to the code collating means in succession to the turn-off of the ignition key switch 2b, the engine start decision processing after the turn-on of the ignition key switch 2b can be promoted remarkably.

Embodiment 2

In the case of the motor-vehicle antitheft apparatus according to the first embodiment of the invention, the rolling code is sent to the code collating means 3A from the engine start decision means 5A. It should however be understood that such arrangement may equally be adopted in which the rolling code generating means incorporated in the engine start decision means 5A sends to the code collating means 3A only the variable code (x) indicating a value of "varying coefficient" which is to be placed in the rolling code generating operation expression upon generation of the rolling code, wherein the code collating means 3A generates the rolling code by placing the variable code in the rolling code generating operation expression established previously. In that case, it is also assumed that the variable code is updated in accordance with the arithmetic processing illustrated in the flow chart of FIG. 8. A second embodiment of the present invention is directed to the arrangement mentioned above.

Figure 4:
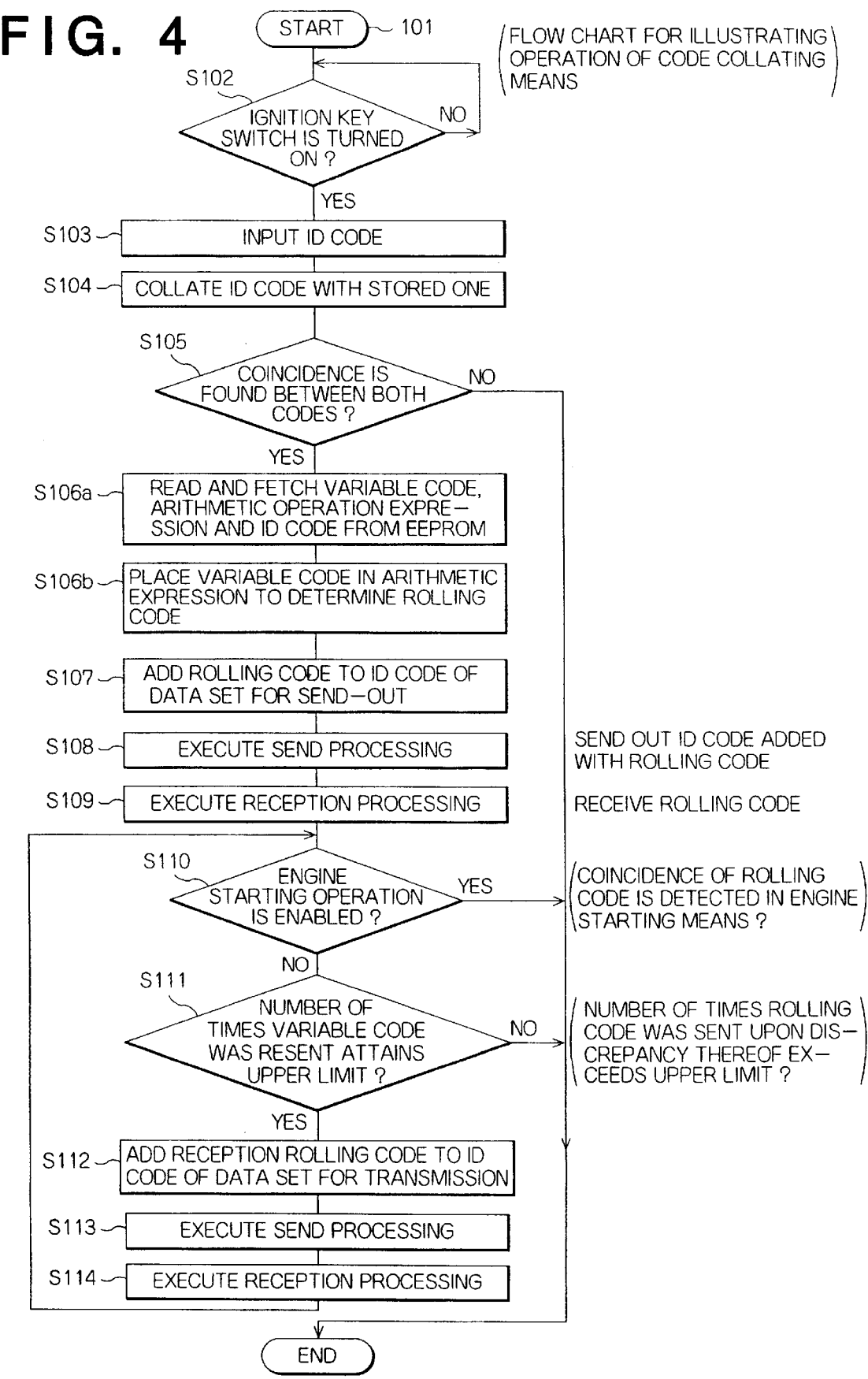
FIG. 4 is a flow chart for illustrating operation of a code collating means incorporated in a motor-vehicle antitheft apparatus according to a second embodiment of the present invention.

Now, referring to a flow chart shown in FIG. 4, operation of the code collating means 3A in the motor-vehicle antitheft apparatus according to the second embodiment of the invention will be described. At first, in a step S101, a driver getting on a motor vehicle inserts the key 1 into the key cylinder 2 and rotates the key 1. Thus, the ID code collating operation is started. In a step S102, the control unit 30b checks whether or not the contact position of the ignition key switch 2b is changed over as a result of the rotation of the key 1 for thereby inputting a power-on signal SG. This check operation is repeated until the power-on signal SG is inputted.

When it is decided that the contact position of the ignition key switch 2b is changed and thus the power-on signal SG is inputted, the processing proceeds to a step S103 where electric power is supplied to the key 1 under the effect of the electromagnetic induction to thereby read out the ID code from the key 1. Subsequently, the processing proceeds to a step S104 where the ID code as fetched is collated or matched with the ID code stored previously in an EEPROM 3e for the collation.

In a step S105, the result of the collation performed in the step S104 is checked. When no coincidence is found between the codes as fetched and the reference codes for the collation, the processing for the ID code collation is terminated. On the other hand, when coincidence is found in the collation of the ID codes, the variable code sent from the engine start decision means 5A when the ignition key switch 2b was turned off the last time as well as the operation expression and the ID code are read out from the EEPROM 3e in a step S106a, which is then followed by a step S106b where the rolling code is arithmetically determined by placing the variable code in the operation expression. Further, in a step S107, the ID code having passed the collation is added or affixed with the rolling code as determined arithmetically in the step S107 to thereby generate data (engine start enabled data) to be sent out to the engine start decision means 5A.

Subsequently, in a step S108, a send processing for sending the data mentioned above to the engine start decision means 5A is performed. In succession, the processing proceeds to a step S109 where processings for receiving the variable code sent from the engine start decision means 5A and indicating the result of the engine start decision executed thereby, engine start enable/disable (inhibit) information indicating inhibition or permission of the engine start operation or data indicating the number of times the variable code was resent are performed.

In a step S110, when it is decided on the basis of the engine start enable/disable information as received that the engine starting operation is enabled, then decision is made that the engine starting operation is based on the authentic data, whereupon the collation processing comes to an end. By contrast, when decision is made in the step S110 that the engine starting operation is inhibited, it is then decided whether or not the number of times the variable code as received was sent exceeds a preset upper limit value.

When it is decided that the number of times the variable code was resent exceeds the preset upper limit, the collating operation of the ID code is terminated. On the other hand, when it is determined that the number of times the variable code was resent does not reach the upper limit value, the processing proceeds to a step S112 where the ID code is added with the rolling code determined on the basis of the variable code received in the step S109 to thereby generate the data to be outputted to the engine start decision means 5A. In succession, a data sending processing for sending the aforementioned data to the engine start decision means 5A is executed in a step S113. Next, in a step S114, data for the decision is received from the engine start decision means 5A, as described hereinbefore in conjunction with the processing step S109, whereupon the processing in the step S110 is resumed. The collating operation is continued until it is decided that the engine start enabling information is obtained or the number of times the variable code was resent exceeds the upper limit number.

Figure 5:
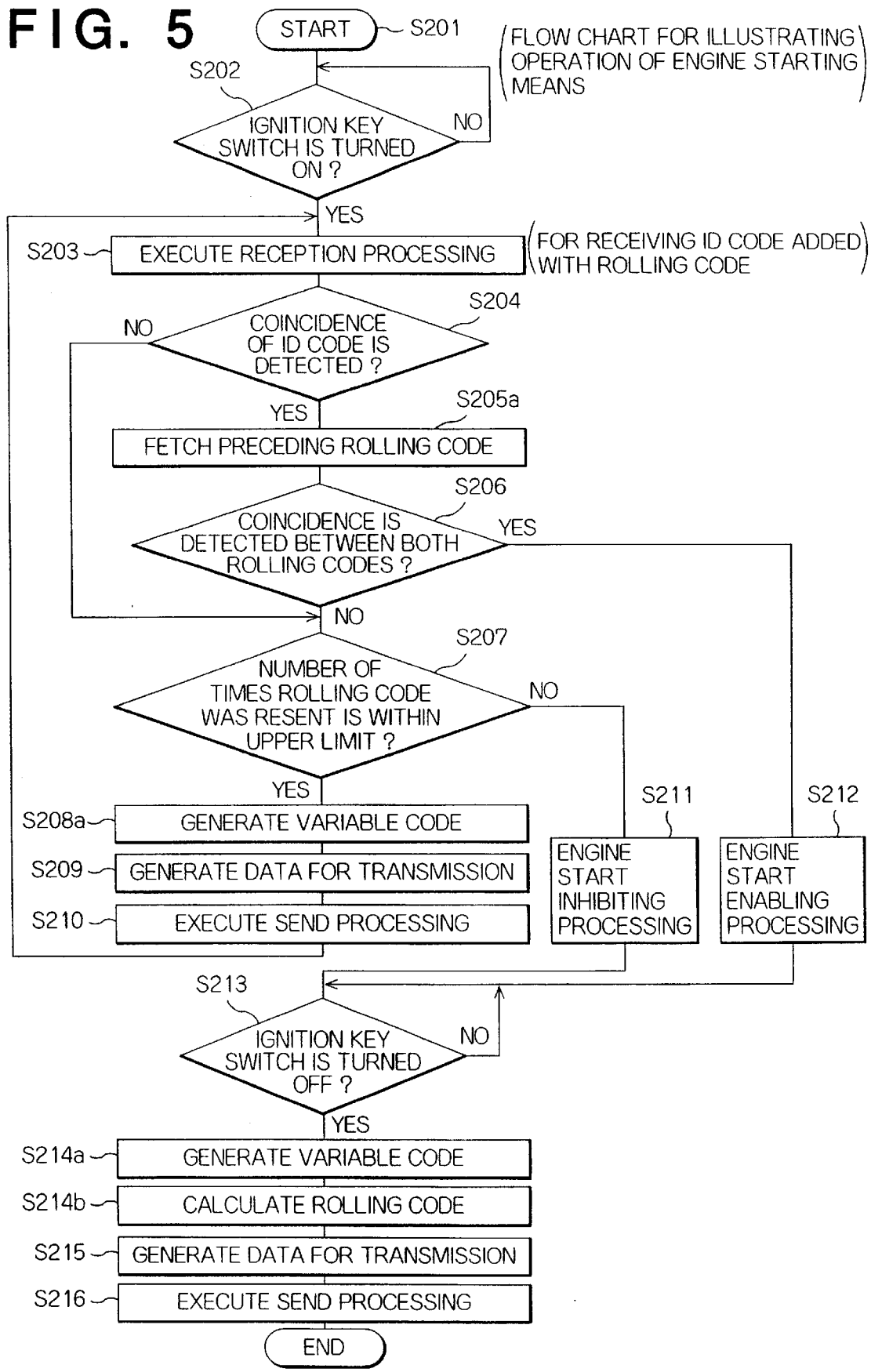
FIG. 5 is a flow chart for illustrating operation of an engine start decision means incorporated in the motor-vehicle antitheft apparatus according to the second embodiment of the invention.

Next, description will turn to an engine start decision processing executed by the control unit 52A constituting a part of the engine start decision means 5A by reference to a flow chart shown in FIG. 5. It should first be mentioned that a rolling code generating means is incorporated in the control unit 52A of the engine start decision means 5A for generating the rolling code by arithmetic operation every time the ignition key switch 2b is turned off, in place of installing the external EEPROM used for storing the rolling code. Parenthetically, the arithmetic processing for determining/updating the variable code is same as that of the rolling code, described hereinbefore by reference to the flow chart shown in FIG. 8.

When the driver gets on the motor vehicle inserts the key 1 into the key cylinder 2 and rotates the key 1, the contact position of the ignition key switch 2b is changed. Then, the control unit 52A makes decision in a step S202 whether or not the power-on signal SG is outputted. Unless the power-on signal SG is inputted, the decision processing for checking whether or not the power-on signal SG is inputted is executed repetitively.

When it is decided that the power-on signal SG is inputted with the contact position of the ignition key switch 2b having been changed correspondingly, the processing proceeds to a step S203 where the reception processing for receiving the data sent from the code collating means 3A is executed. Subsequently, in a step S204, the ID code contained in the data as received is compared with the ID code stored in an internal ROM (Read-Only Memory) for thereby deciding whether coincidence can be found between the ID code as received and the ID code stored in the internal ROM.

When coincidence is found in the comparison of the ID codes mentioned above, the processing proceeds to a step S205a where the control unit 52A reads out the rolling code which is held in an internal register and which was determined by placing the variable code in the operation expression when the ignition key switch 2b was turned off the last time. The rolling code as read out is compared in a step S206 with the rolling code contained in the data received in the step S203. When coincidence is detected between both the rolling codes in the step S206, the processing proceeds to a step S212 where the engine start enabling processing is executed.

On the other hand, when discrepancy is found between the ID codes or between the rolling codes, the processing proceeds to a step S207 where it is checked whether or not the number of times the variable code was resent (or sent again) to the code collating means 3A for obtaining the data therefrom has reached the preset upper limit number. Unless the upper limit number has been attained, the processing proceeds to a step S208a at which the variable code is again generated.

The variable code generated is converted into the data to be sent to the code collating means 3A in a step S209, whereupon the processing proceeds to a step S210 where the send-out or transmission processing is performed. More specifically, every time the variable code is sent repeatedly, the code collating means 3A calculates the rolling code and adds the ID code with the rolling code to thereby generate the data to be sent back to the engine start decision means 5A.

The engine start decision means 5A executes repetitionally a routine comprised of the step S204 to the step S210 inclusive thereof upon every reception of the data in the step S203. When the ID code and the rolling code contained in the data as received coincide with the respective preset codes, the engine start enabling processing is executed in a step S212.

However, unless the ID code or the rolling code coincides with the respective preset code and when it is decided in the step S207 that the number of times the variable code was resent exceeds the upper limit number, the processing proceeds to a step S211 to execute the engine start disabling or inhibiting processing.

When the engine start disable or inhibit processing is executed in the step S211 or when the engine start enabling processing is executed in the step S212, the processing proceeds to a step S213 to wait for detection of the turn-off of the ignition key switch 2b. Upon detection of the turn-off of the ignition key switch 2b, the processing proceeds to a step S214a where a new variable code is generated by the variable code generating means. Further, the rolling code is arithmetically determined and generated on the basis of the variable code as generated in a step S214b.

After the variable code generated is converted to the data to be sent out in a step S215, the processing proceeds to a step S216, where send processing to the code collating means 3A is performed, whereupon the processing now of concern comes to an end. The variable code as sent out is used for arithmetically determining the rolling code in the code collating means 3A. At the same time, information concerning the number of times the variable code was resent, the result of the engine start disable or inhibit processing as well as the engine start enable processing is reset.

In the foregoing description, it has been made assumed that upon decision of discrepancy of the rolling code, the same variable code is generated to be resent. It should however be appreciated that different variable codes may be generated to this end. In that case, secrecy of the rolling code can be enhanced significantly.

As is apparent from the foregoing, the code collating operation is not stopped definitely even when discrepancy in the ID code or the rolling code is detected by accident due to error in the communication. Accordingly, the reliability of the motor-vehicle antitheft apparatus can significantly be enhanced. Furthermore, because the variable code employed for generating the rolling code is sent to the collating means from the engine start decision means, the rolling code can be protected against being picked up before the engine start signal is sent. Additionally, by virtue of such arrangement that the rolling code is arithmetically determined by each of the code collating means 3A and the engine start decision means 5A, reliability of the coincidence decision for the rolling code can be enhanced considerably.

Embodiment 3

In conjunction with the motor-vehicle antitheft apparatus according to the first embodiment of the invention, no particular consideration has been paid to the scheme for establishing the operation expression for generating the rolling code. However, from the standpoint of secrecy of the rolling code, it is preferred that a plurality of operation expressions for generating rolling codes are prepared in advance so that both of the code collating means 3A and the engine start decision means 5A can select a same one from the plurality of the operation expressions for thereby allowing both the code collating means 3A and the engine start decision means 5A to generate the rolling codes, respectively, by placing the variable code determined by the engine start decision means 5A in the selected operation expression. The third embodiment of the present invention is directed to the arrangement described above. To this end, the code collating means 3A according to the instant embodiment is designed to include the operation expression selecting means for selecting a given one of plural operation expressions stored in an internal ROM incorporated in the control unit 30b every time the ignition key switch 2b is turned on and a rolling code arithmetic determination means.

Each of the engine start decision means 5A and the code collating means 3A is equipped with a ROM for storing a plurality of operation expressions for determining arithmetically the rolling codes, respectively, wherein each of the code collating means 3A and the engine start decision means 5A selects a same operation expression for determining the rolling code every time the ignition key switch 2b is turned on, while updating sequentially the operation expressions. To this end, there may be prepared first to fifth rolling code determining operation expressions, wherein after the fifth operation expression is selected finally, then the first operation expression is selected again, which is then followed by selection of the second operation expression and so forth.

The code collating means 3A determines the rolling code by placing the variable code determined by the engine start decision means 5A upon every turn-off of the ignition key switch 2b in the rolling code determining operation expression as selected. Parenthetically, the method or process for determining the variable code as well as the scheme for determining the rolling code may be of essentially same nature as the method described in conjunction with the second embodiment.

Figure 6:
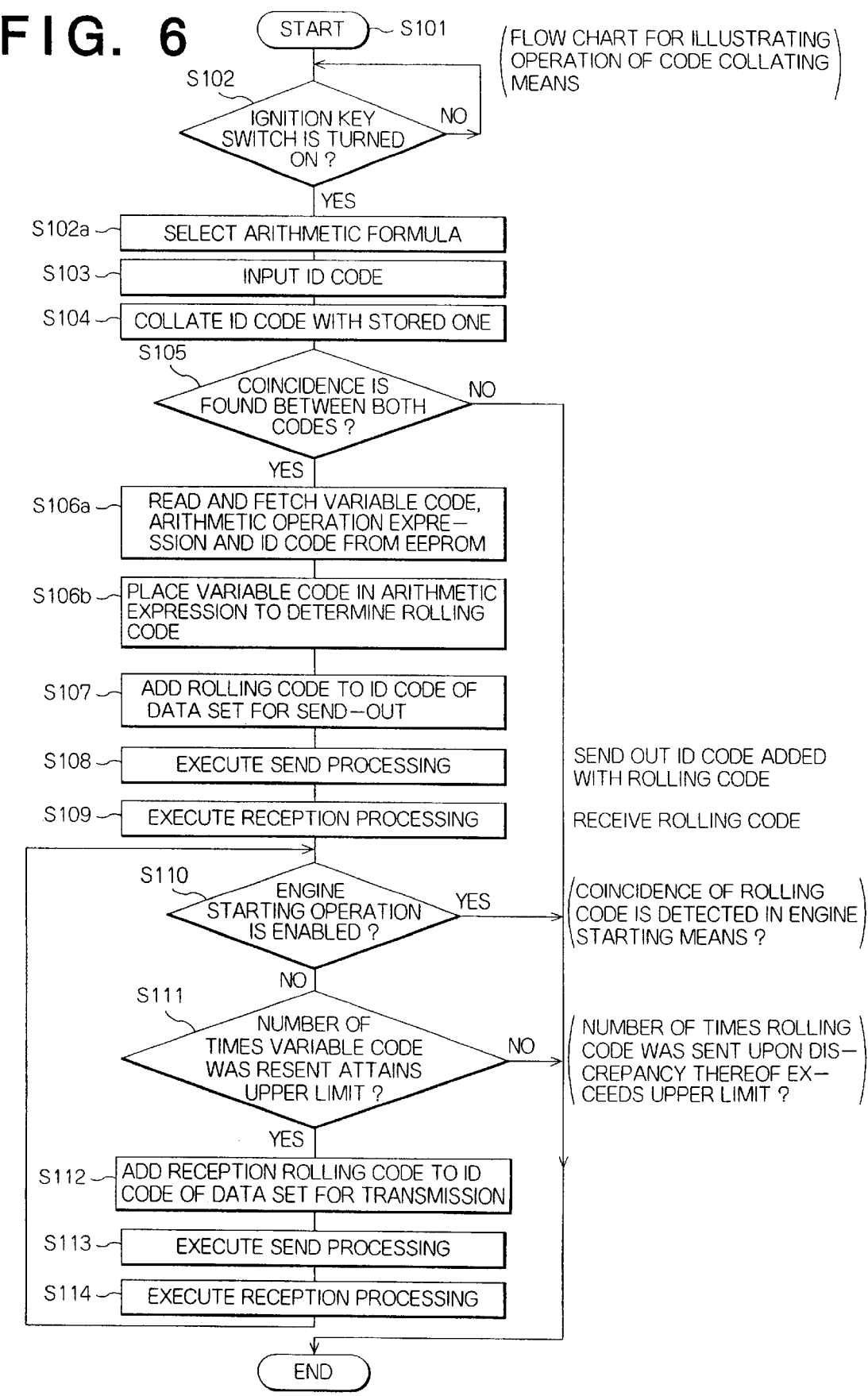
FIG. 6 is a flow chart for illustrating operation of a code collating means incorporated in a motor-vehicle antitheft apparatus according to a third embodiment of the present invention.

Next, referring to a flow chart shown in FIG. 6, description will turn to operation of the code collating means 3A in the motor-vehicle antitheft apparatus according to the third embodiment of the invention. First, in a step S101, a driver getting on a motor vehicle inserts the key 1 into the key cylinder 2 and rotates it, whereby the ID code collating operation is started. In a step S102, the control unit 30b checks whether or not the contact position of the ignition key switch 2b is changed over by the manipulation of the key 1 and whether or not the power-on signal SG is inputted, the check operation is repeated until the power-on signal SG is inputted.

When it is decided that the contact position of the ignition key switch 2b is changed and the power-on signal SG is inputted, the processing proceeds to a step S102a where a first rolling code determining operation expression is selected from a plurality of operation expressions stored in the internal ROM incorporated in the control unit 30b.

Next, the processing proceeds to a step S103 where electric power is supplied to the key 1 by making use of the electromagnetic induction to thereby read out the ID code from the key 1, whereon the processing proceeds to a step S104 where the ID code as fetched is collated or matched with the ID code stored previously in the EEPROM 3e for the collation.

In a step S105, the result of the collation performed is checked. When no coincidence is detected between the ID code as fetched and the reference ID code read out from the EEPROM 3e, the processing for the ID code collation is terminated. On the other hand, when coincidence is found, then the ID code stored in the EEPROM 3e in a step S106a, the operation expression selected in the step S102a and the variable code received from the engine start decision means 5A when the ignition key switch 2b was turned off the last time are fetched.

Subsequently, in a step S106b, the variable code is placed in the selected operation expression for determining the rolling code. Further, in a step S107, the ID code for which coincidence has been detected as the result of the collation is added or affixed with the rolling code to thereby generate the data to be sent out to the engine start decision means 5A.

Subsequently, in a step S108, a send processing for sending the data to the engine start decision means 5A is performed. Now, in a step 109, processings for receiving the variable code sent from the engine start decision means 5A on the basis of the result of the engine start decision, engine start enable/disable information indicating inhibition or permission of the engine start operation or data indicating the number of times the variable code has been resent are executed.

In a step S110, when it is decided on the basis of the engine start enable/disable information as received that the engine starting operation is enabled, then decision is made that the engine starting operation is based on the authentic data, whereupon the collation processing comes to an end. On the contrary, when decision is made in the step S110 to such effect that the engine starting operation is inhibited, decision is then made as to whether or not the number of times the variable code as received was resent exceeds a preset upper limit value.

When it is decided that the number of times the variable code was resent exceeds the upper limit, the ID code collating operation is terminated. On the other hand, unless the number of times the variable code was resent reaches the upper limit number, the processing proceeds to a step S112 where the ID code is added or affixed with the rolling code calculated on the basis of the variable code to thereby generate the data to be outputted. In succession, a data sending processing is executed in a step S113. Thereafter, in a step S114, the data demanded for the decision is received from the engine start decision means 5A, as described hereinbefore in conjunction with processing step S109, whereupon the processing in the step S110 is resumed. The collating operation is continued until it is decided that the engine start enabling information is obtained or the number of times the variable code was resent exceeds the upper limit number.

Figure 7:
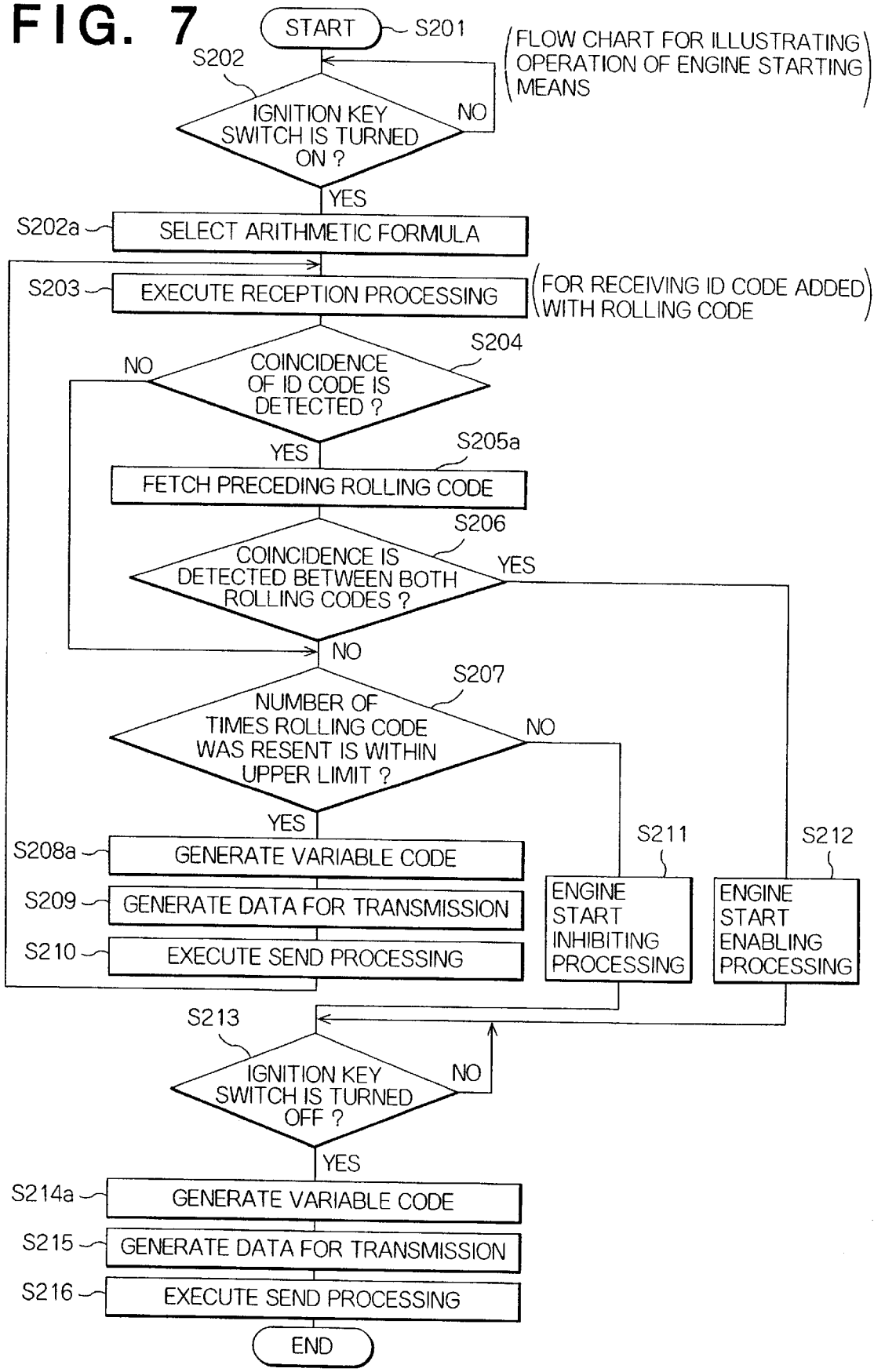
FIG. 7 is a flow chart for illustrating operation of an engine start decision means incorporated in the motor-vehicle antitheft apparatus according to the third embodiment of the present invention.

Next, referring to a flow chart shown in FIG. 7, description will be directed to an engine start decision processing executed by the control unit 52A constituting a part of the engine start decision means 5A. At first, it should be mentioned that the engine start decision means 5A according to the instant embodiment includes an operation expression selecting means for selecting a particular one from a plurality of operation expressions for determining the rolling codes as stored in the internal ROM in place of installing the external EEPROM used for storing the rolling code, a variable code generating means for arithmetically determining the variable code to be placed in the selected operation expression and the arithmetic means for determining the rolling code. Parenthetically, the variable code can be determined essentially in a same manner as described hereinbefore in conjunction with the processing for determining the rolling code by reference to the flow chart shown in FIG. 8.

When the driver getting on the motor vehicle inserts the key 1 into the key cylinder 2 and rotates the key 1, the contact position of the ignition key switch 2b is changed over. Then, the control unit 52A makes decision in a step S202 whether or not the power-on signal SG is outputted. Unless the power-on signal SG is inputted, decision processing for checking whether or not the power-on signal SG is inputted is executed repetitively.

When it is decided that the power-on signal SG is inputted with the contact position of the ignition key switch 2b having been changed correspondingly, the first rolling code operation expression is selected from a plurality of expressions in a step S202a. At that time point, the code collating means 3A also selects the first rolling code arithmetic operation expression. The processing then proceeds to a step S203 where the reception processing for receiving the data sent from the code collating means 3A is executed.

Subsequently, in a step S204, the ID code contained in the data as received is compared with the ID code stored in an internal ROM for thereby deciding whether coincidence can be found between the ID code as received and the ID code stored in the internal ROM. When coincidence is found in the comparison of the ID codes mentioned above, the processing proceeds to a step S205a where the control unit 52A reads out from the internal memory the rolling code which has been determined by placing the variable code determined upon turn-off of the ignition switch 2b in the rolling code arithmetic operation expression as selected (i.e., the first expression in this case). The rolling code as read out is compared in a step S206 with the rolling code contained in the data received in the step S203. When coincidence is detected in the step S206, the processing proceeds to a step S212 where the engine start enabling processing is executed.

On the other hand, when discrepancy between the ID codes is found, the processing proceeds to a step S207 where it is checked whether or not the number of times the variable code was resent (or sent again) to the code collating means 3A for obtaining the data therefrom has reached the preset upper limit value. Unless the upper limit has been attained, the processing proceeds to a step S208 at which the same variable code is again generated.

The variable code as generated is converted into the data suited for sending out in a step S209, whereupon the processing proceeds to a step S210 where the send-out or transmission processing is performed. More specifically, every time the variable code is sent repeatedly, the code collating means 3A arithmetically determines the rolling codes and adds the ID code with the rolling code to thereby generate the data to be resent to the engine start decision means 5A.

The engine start decision means 5A executes repetitionally a routine comprised of the step S204 to the step S210 inclusive thereof upon every reception of the data in the step S203. When the ID code and the rolling code contained in the data as received coincide with the respective preset codes, the engine start enabling processing is executed in a step S212.

However, unless the ID code coincides with the respective preset code and when it is decided in the step S207 that the number of times the variable code was resent exceeds the upper limit number, the processing proceeds to a step S211 to execute the engine start disabling or inhibiting processing.

When the engine start disable or inhibit processing is executed in the step S211 and when the engine start enabling processing is executed in the step S212, the processing proceeds to a step S213 to wait for detection of the turn-off of the ignition key switch 2b. Upon detection of the turn-off of the ignition key switch 2b, the processing proceeds to a step S214a where a new variable code is generated and executed by the variable code generating means.

After the variable code generated is converted to the data to be sent out in a step S215, the processing proceeds to a step S216, where the processing of concern comes to an end, after having executed the send-out processing to the code collating means 3A is performed. The variable code as sent out is used in determining arithmetically the rolling code in the code collating means 3A. At the same time, information concerning the number of times the variable code was resent, the result of the engine start disable or inhibit processing as well as the engine start enable processing is reset.

In the motor-vehicle antitheft apparatus according to the instant embodiment of the invention, each of the code collating means 3A and the engine start decision means 5A selects the arithmetic operation expression sequentially from a plurality of expressions prepared previously, every time the ignition key switch 2b is turned on. However, the present invention is never restricted to such arrangement. Alternatively, it is equally possible to adopt such arrangement that the engine start decision means 5A selects at random the rolling code arithmetic operation expressions from plural ones every time the ignition key switch 2b is turned on, whereon the information about the selected expression is sent to the code collating means to allow the latter to select the same expression.

As will now be appreciated from the foregoing, in the motor-vehicle antitheft apparatus according to the present invention, reliability of operation of the apparatus can significantly be improved and enhanced because the collating operation is not definitely terminated even when discrepancy is accidentally decided between the ID codes stored and read out from the key, respectively, or between the rolling codes generated and affixed to the ID code, respectively, due to error in communication for transferring these codes. Furthermore, because the variable code for generating the rolling code is sent to the code collating means from the engine start decision means, the rolling code can be protected from being picked-up in precedence to the outputting of the engine start signal. Besides, since the code collating means 3A and the engine start decision means 5A arithmetically determine the rolling code in accordance with the arithmetic operation expression which is updated every time the ignition switch is turned on, not only the reliability of the result of the rolling code coincidence decision but also the secrecy or security of the rolling code can considerably be improved or enhanced.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. An apparatus for protecting a motor vehicle against unauthorized operation thereof, comprising:

code reading means for reading out an identification code stored in an engine key upon every starting of operation of said motor vehicle, said code reading means being provided in association with means for receiving said engine key;

identification code decision means for collating said identification code read out from said engine key with a preset identification code to thereby make decision as to whether or not both of said identification codes coincide with each other;

rolling code adding means responsive to coincidence between both of said identification codes for thereby adding or affixing to said identification code as read out a rolling code updated every time the internal combustion engine of said motor vehicle is operated, to thereby generate engine start enabling signal;

engine start enabling signal sending means for sending said engine start enabling signal;

rolling code generating means for executing an arithmetic process to attendantly generate said rolling code for generating said rolling code which is updated every time said engine is operated;

rolling code sending means for sending said rolling code generated to said rolling code adding means;

engine start enabling signal receiving means for receiving said engine start enabling signal;

identification code decision means for making decision as to coincidence between the identification code contained in the engine start enabling signal as received and said preset identification code; and rolling code decision means responsive to coincidence of the identification codes for thereby collating the rolling code contained in said engine start enabling signal with the rolling code generated by said rolling code generating means, to thereby output said engine start enabling signal to engine starting means upon detection of coincidence between said rolling codes.

2. A motor-vehicle protecting apparatus according to claim 1, wherein said rolling code decision means receives again said engine start enabling signal from said rolling code adding means through said engine start enabling signal receiving means upon decision of discrepancy between said rolling codes, to thereby make decision as to coincidence of the rolling codes.

3. A motor-vehicle protecting apparatus according to claim 1, wherein when said rolling code decision means decides discrepancy between said rolling codes, said rolling code generating means generates a rolling code differing from that generated in precedence, to thereby send the generated rolling code to said rolling code adding means by way of said rolling code sending means.

4. A motor-vehicle protecting apparatus according to claim 1, wherein said rolling code sending means is adapted to update said rolling code upon turning-off of said engine key to thereby send the updated rolling code to said rolling code adding means.

5. A apparatus for protecting a motor vehicle against unauthorized operation thereof, comprising:

code reading means for reading out an identification code stored in an engine key upon every starting of operation of said motor vehicle, said code reading means being provided in association with means for receiving said engine key;

identification code decision means for collating said identification code read out from said engine key with a preset identification code to thereby make decision as to whether or not both of said identification codes coincide with each other;

first rolling code arithmetic operation means for arithmetically determining said rolling code on the basis of a variable which is updated upon every operation of said engine;

rolling code adding means responsive to coincidence between both of said identification codes for thereby adding to said identification code as read out a rolling code determined arithmetically to thereby generate an engine start enabling signal;

engine start enabling signal sending means for sending said engine start enabling signal;

variable generating means for generating a variable which is updated every time said engine is operated;

second rolling code arithmetic means for arithmetically determining the rolling code on the basis of said variable as generated;

variable sending means for sending said generated variable as generated to said first rolling code arithmetic operation means;

engine start enabling signal receiving means for receiving said engine start enabling signal;

identification code decision means for making decision as to coincidence between the identification code contained in the engine start enabling signal as received and said preset identification code; and rolling code decision means responsive to coincidence of the identification codes for thereby collating the rolling code contained in said engine start enabling signal with the rolling code generated by said second rolling code arithmetic operation means, to thereby output said engine start enabling signal to engine starting means upon detection of coincidence between said rolling codes.

6. A motor-vehicle protecting apparatus according to claim 5, further including a plurality of said first rolling code arithmetic operation means and a plurality of said second rolling code arithmetic operation means which differ from one another in respect to arithmetic operation expression;

wherein every time the internal combustion engine of said motor vehicle is operated, said first and second rolling code arithmetic operation means are selected sequentially; and wherein a variable determined arithmetically is placed in said arithmetic operation expression as selected to thereby determine arithmetically the rolling code.

7. A motor-vehicle protecting apparatus according to claim 5, including a plurality of said first rolling code arithmetic operation means and a plurality of said second rolling code arithmetic operation means which differ from one another in respect to arithmetic operation expression, wherein every time the internal combustion engine of said motor vehicle is operated, said first and second rolling code arithmetic operation means are selected at random; and wherein a variable determined arithmetically is placed in said arithmetic operation expression as selected to thereby determine arithmetically the rolling code.

8. A motor-vehicle protecting apparatus according to claim 5, wherein upon decision of discrepancy between said rolling codes by said rolling code decision means, said variable generating means arithmetically determines a variable differing from the one generated the last time, said variable being then sent to said first and second rolling code arithmetic operation means by way of said variable sending means.

9. A motor-vehicle protecting apparatus according to claim 5, wherein said variable generating means sends a variable as updated when said engine key is turned off to said first and second rolling code arithmetic operation means.

* * * * *

UNITED STATES PATENT AND TRADEMARK OFFICE
CERTIFICATE OF CORRECTION

PATENT NO.    : 5,973,411
DATED         : October 26, 1999
INVENTOR(S)   : Tado, Masahiro et al.

It is certified that error appears in the above-identified patent and that said Letters Patent is hereby corrected as shown below:

Title page,
Please correct the filing date to read : -- June 24, 1996 --.

Signed and Sealed this

Second Day of April, 2002

Attest:

JAMES E. ROGAN
*Attesting Officer*    *Director of the United States Patent and Trademark Office*